US006959449B1

(12) United States Patent
Fujii (10) Patent No.: US 6,959,449 B1
(45) Date of Patent: Oct. 25, 2005

(54) SYSTEM AND METHOD FOR SIMULTANEOUSLY ACCESSING VIDEO DATA AND INTERNET PAGE DATA

(75) Inventor: Toshiya Fujii, Menlo Park, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/093,271

(22) Filed: Jun. 8, 1998

(51) Int. Cl.[7] .................. H04N 7/173; H04N 5/445; G06F 15/16; G06F 17/00; G09G 5/00
(52) U.S. Cl. ................. 725/110; 725/109; 725/112; 725/113; 725/43; 709/217; 709/219; 345/715; 345/723; 715/719; 715/784; 715/785
(58) Field of Search .................. 725/109–110, 131, 725/112–113, 135–137, 39–61; 348/564–566; 345/723, 43, 719–720, 760, 788–798, 715; 345/648; 709/217–219, 204; 715/719, 784, 715/785, 500.1

(56) References Cited

U.S. PATENT DOCUMENTS

| | | | | |
|---|---|---|---|---|
| 4,785,296 A | * | 11/1988 | Tabata et al. | |
| 5,524,193 A | * | 6/1996 | Covington et al. | 715/512 |
| 5,572,643 A | * | 11/1996 | Judson | 709/218 |
| 5,694,163 A | * | 12/1997 | Harrison | 348/13 |
| 5,742,768 A | * | 4/1998 | Gennaro et al. | 1/1 |
| 5,745,910 A | * | 4/1998 | Piersol et al. | 707/515 |
| 5,774,666 A | * | 6/1998 | Portuesi | 395/200.48 |
| 5,778,181 A | * | 7/1998 | Hidary et al. | 395/200.48 |
| 5,844,620 A | * | 12/1998 | Coleman et al. | 725/54 |
| 5,845,299 A | * | 12/1998 | Arora et al. | 707/513 |
| 5,884,056 A | * | 3/1999 | Steele | 345/738 |
| 5,897,644 A | * | 4/1999 | Nielsen | 715/513 |
| 5,900,872 A | * | 5/1999 | Ashe | 715/786 |
| 5,929,849 A | * | 7/1999 | Kikinis | 345/327 |
| 5,940,073 A | * | 8/1999 | Klosterman et al. | 345/721 |
| 5,959,621 A | * | 9/1999 | Nawaz et al. | 345/733 |
| 6,005,565 A | * | 12/1999 | Legall et al. | 345/327 |
| 6,008,836 A | * | 12/1999 | Bruck et al. | 348/6 |
| 6,078,306 A | * | 6/2000 | Lewis | 345/123 |
| 6,081,830 A | * | 6/2000 | Schindler | 709/204 |
| 6,101,472 A | * | 8/2000 | Giangarra et al. | 704/275 |
| 6,144,991 A | * | 11/2000 | England | 709/205 |
| 6,157,381 A | * | 12/2000 | Bates et al. | 345/786 |
| 6,184,878 B1 | * | 2/2001 | Alonso et al. | 725/109 |
| 6,204,845 B1 | * | 3/2001 | Bates et al. | 345/788 |
| 6,222,541 B1 | * | 4/2001 | Bates et al. | 345/341 |
| 6,275,829 B1 | * | 8/2001 | Angiulo et al. | 707/104.1 |
| 6,278,448 B1 | * | 8/2001 | Brown et al. | 345/866 |
| 6,305,020 B1 | * | 10/2001 | Hoarty et al. | 725/95 |
| 6,367,080 B1 | * | 4/2002 | Enomoto et al. | 725/112 |
| 6,510,557 B1 | * | 1/2003 | Thrift | 725/110 |
| 6,510,558 B1 | * | 1/2003 | Linuma et al. | 725/113 |
| 6,515,680 B1 | * | 2/2003 | Hendricks et al. | 345/716 |
| 6,789,080 B1 | * | 9/2004 | Sweet et al. | 707/10 |
| 2002/0143853 A1 | * | 10/2002 | Isaac et al. | 709/201 |
| 2003/0140159 A1 | * | 7/2003 | Campbell et al. | 709/231 |

* cited by examiner

Primary Examiner—Chris Grant
Assistant Examiner—Son P. Huynh
(74) Attorney, Agent, or Firm—Gregory J. Koerner; Redwood Patent Law (57) ABSTRACT

A system and method for simultaneously accessing video data and Internet page data includes a format manager that inserts a video tag into page data to concurrently display a positionable video window and the page data upon the screen of a display device. The format manager reformats the displayed page data to avoid the video window when shown on the display device. The format manager also maintains the video window in a stationary position when a system user scrolls the page data in relation to the video window.

4 Claims, 10 Drawing Sheets

```
<HTML>
<HEAD>
<TITLE>My Home Page</TITLE>
</HEAD>

<BODY>

[VIDEO TAG] quick brown fox jumps over the lazy dog. QUICK
BROWN FOX JUMPS OVER THE LAZY DOG.quick brown fox
jumps over the lazy dog. QUICK BROWN FOX JUMPS OVER THE
LAZY DOG.quick brown fox jumps over the lazy dog. QUICK BROWN
FOX JUMPS OVER THE LAZY DOG.quick brown fox jumps over the
lazy dog. QUICK BROWN FOX JUMPS OVER THE LAZY DOG.

</BODY>
</HTML>
```

SYSTEM AND METHOD FOR SIMULTANEOUSLY ACCESSING VIDEO DATA AND INTERNET PAGE DATA

BACKGROUND OF THE INVENTION

1. Field of the Invention

This invention relates generally to electronic systems that access and use information obtained from distributed computer networks, and relates more particularly to a system and method for simultaneously accessing video data and Internet page data.

2. Description of the Background Art

Efficient techniques for accessing and utilizing information are important considerations for manufacturers, designers and individual users of modern electronic information systems. Sources of such electronically-available information include various types of electronic networks, such as the Internet, which are typically accessible through a compatible computer device or other similar electronic system.

One significant contemporary technique for accessing information available on the Internet consists of a television set (for displaying information) and a "set-top box" device (for accessing selected information from the Internet and then providing the accessed information to the corresponding television set for display). As the foregoing name implies, a set-top box is typically a relatively small and economical device which is located near the television set to serve as an efficient interface with the Internet in consumer home-use applications.

A consumer television system that also accesses the Internet may therefore be used either in the normal television viewing mode, or may alternately be used to access and view selected Internet data pages ("web pages"). Since a live television broadcast may contain subject matter of immediate interest to a viewer, several methods for simultaneously accessing "live" video data and Internet data pages have been developed.

Figure 1A:
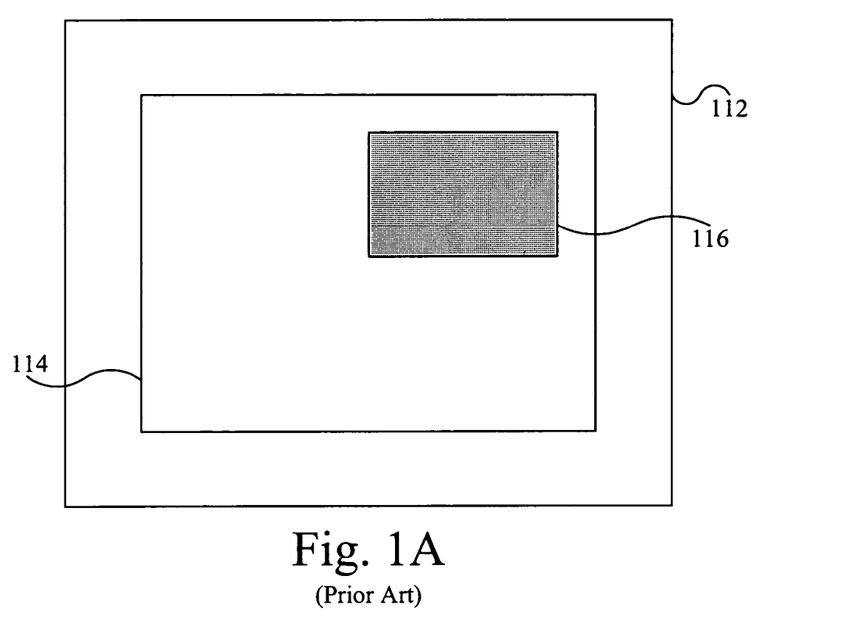
FIG. 1A is a block diagram of a basic picture-in-picture system for displaying video data.

Referring now to FIG. 1A, a block diagram of a basic picture-in-picture system for displaying video data is shown. FIG. 1A includes a television 112 having a display screen 114 for displaying selected data. According to the picture-in-picture method for displaying multiple sources on screen 114, a first video source is displayed on screen 114, and a second video source is displayed on a smaller display area 116. Although two data sources are simultaneously displayed on television 112, the display area 116 covers a section of screen 114, and a viewer of television 112 is thus prevented from viewing images from the first video source which are obscured by superimposed display area 116.

Figure 1B:
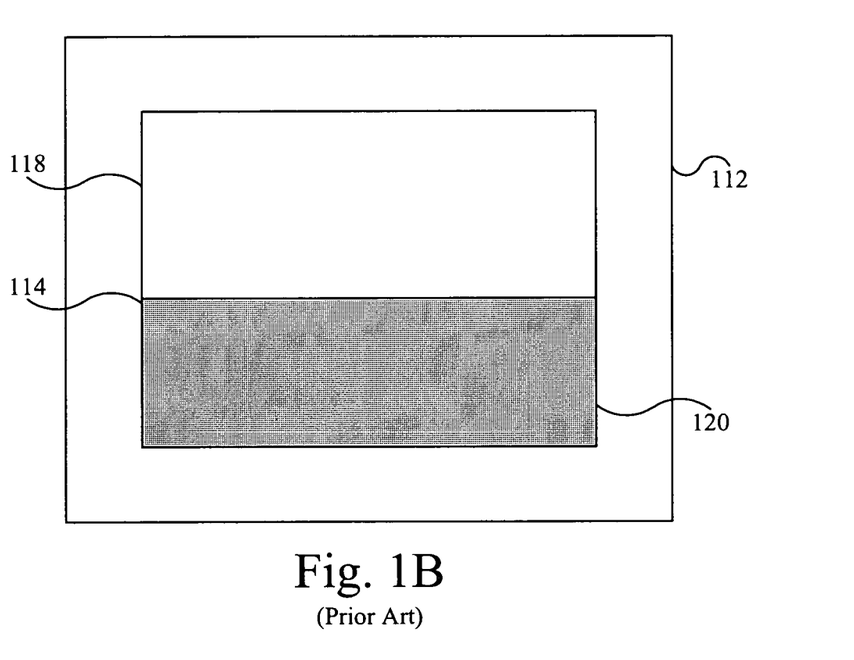
FIG. 1B is a block diagram of a basic split-screen system for displaying video data.

Referring now to FIG. 1B, a block diagram of a basic split-screen system for displaying video data is shown. FIG. 1B includes a television 112 having a display screen 114 for displaying selected data. According to the split-screen method for displaying multiple sources on television 112, a first video source is displayed on a split-screen area 118, and a second video source is displayed on a split-screen area 120.

The screen 114 of television 112 has a fixed horizontal-versus-vertical aspect ratio, and consequently, data intended for display on television 112 is formatted to conform to the appropriate aspect ratio. Although two data sources are simultaneously displayed on television 112, the aspect ratios of both spit-screen area 118 and split-screen area 120 are significantly altered by employing the foregoing split-screen technique. A change in aspect ratio thus results in displayed images which are not correctly sized to conform to the size of spit-screen area 118 and split-screen area 120.

The foregoing problems result in either the loss of displayed information, or the inefficient use of space on screen 114. However, simultaneously accessing multiple sources of visual information, while avoiding the problems discussed above in conjunction with FIG. 1A and FIG. 1B, would clearly provide a powerful and effective system for utilizing various types of data. Therefore, for all the foregoing reasons, an improved system and method are needed for simultaneously accessing video data and Internet page data.

SUMMARY OF THE INVENTION

In accordance with the present invention, a system and method are disclosed for simultaneously accessing video data and Internet page data. In the preferred embodiment, the present invention comprises a television and a set-top box which preferably includes a central processing unit (CPU), a memory, and a format manager.

In operation, the CPU initially accesses video data from a video source, such as a television broadcast or a cable television network. The CPU then accesses selected page data from the Internet or other source. Next, the format manager copies the accessed page data to obtain duplicate page data which is preferably stored in the memory.

The format manager then computes a current reference position which is preferably also stored in the memory. The current reference position is a changeable location in the duplicate page data that corresponds to a fixed position on the screen of the television. The format manager uses the current reference position as a stationary reference point on the television's screen from which to accurately position a video window.

The format manager then preferably accesses an editable video tag from the memory and inserts the video tag into the duplicate page data to indicate the vertical alignment of the video window in the television screen. The video tag also preferably includes sizing and horizontal alignment information for the video window. The format manager next displays the duplicate page data (now containing the inserted video tag) on the television. The format manager also reformats the contents of the duplicate page data to avoid the video window, and to utilize the remaining area of the television screen in an effective manner.

The format manager then inserts the previously-obtained video data into the video window (displayed on the television screen) to simultaneously display video data and Internet page data, according to the present invention. The format manager also periodically determines whether the displayed duplicate page data has been scrolled on the television screen in relation to the stationary video window. If the displayed duplicate page data has been scrolled, then the format manager stores a corresponding scroll value into memory. The scroll value is preferably proportional to the distance that the duplicate page data was scrolled, and may thus be used by the format manager to recalculate a current reference value to maintain the video window in a stationary position on the television screen. In the event of any scrolling actions, the format manager also preferably reformats the newly-positioned page data to avoid the stationary video window.

Simultaneously accessing video data and page data thus provides a more efficient and effective methodology for utilizing Internet information while viewing live television programming. The present invention therefore provides an improved system and method for simultaneously accessing video data and Internet page data.

DETAILED DESCRIPTION OF THE PREFERRED EMBODIMENT

The present invention relates to an improvement in electronic systems that interact with the Internet or other distributed electronic networks. The following description is presented to enable one of ordinary skill in the art to make and use the invention and is provided in the context of a patent application and its requirements. Various modifications to the preferred embodiment will be readily apparent to those skilled in the art, and the generic principles herein may be applied to other embodiments. Thus, the present invention is not intended to be limited to the embodiment shown, but is to be accorded the widest scope consistent with the principles and features described herein.

The present invention comprises a system and method for simultaneously accessing video data and Internet page data, and includes a format manager that inserts a video tag into page data to concurrently display a positionable video window and the page data upon the screen of a display device. The format manager reformats the displayed page data to avoid the video window shown on the display device. The format manager also maintains the video window in a stationary location when a system user scrolls the page data in relation to the video window.

Figure 2:
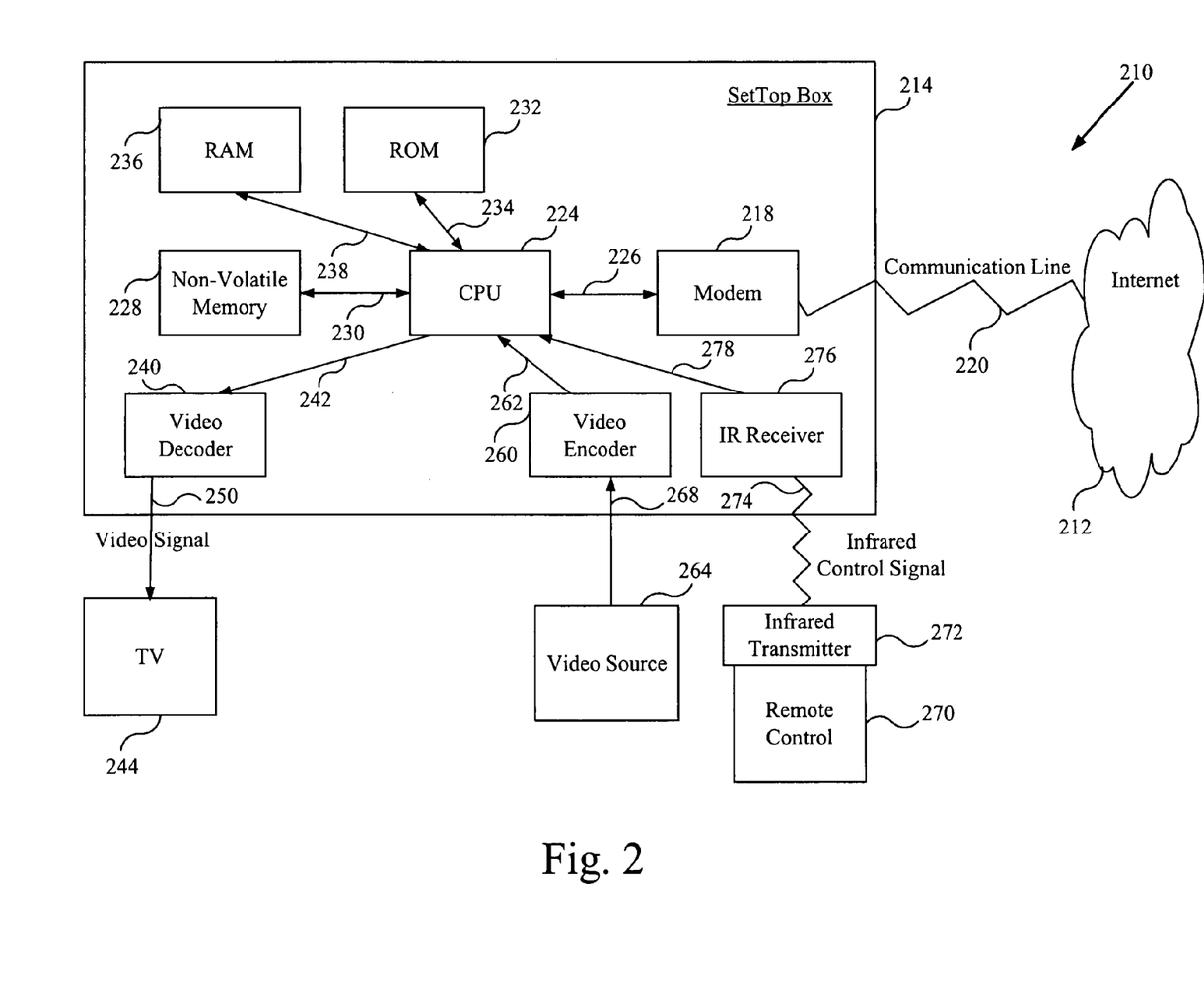
FIG. 2 is a block diagram of one embodiment for a system that simultaneously accesses video data and Internet page data, in accordance with the present invention.

Referring now to FIG. 2, a block diagram of one embodiment for a system 210 that simultaneously accesses video data and Internet page data is shown, in accordance with the present invention. The FIG. 2 embodiment includes a set-top box 214, a television (TV) 244, a video source 264, and a remote control 270. Set-top box 214 preferably includes a modem 218, a central processing unit (CPU) 224, a non-volatile memory 228, a read-only memory (ROM) 232, a random-access memory (RAM) 236, a video decoder 240, a video encoder 260, and an infrared (IR) receiver 276.

In the FIG. 2 embodiment, system 210 may alternately operate in a television mode, in an Internet mode, or in a simultaneous viewing mode, which combines the television and the Internet modes, according to the present invention. In the television mode, video source 264 provides a compatible video signal to video encoder 260 via line 268. Video source 264 may include, but is not limited to, a video camera system, a television tuner device, a cable television system, or a video digitizer device.

Video encoder 260 responsively encodes the received video signal and provides the encoded video signal to CPU 224 via line 262. CPU 224 then may provide the encoded video signal to video decoder 240 via line 242 to be decoded and then provided, via line 250, to TV 244 for display.

A user of system 210 may use remote control 270 to input various types of information for controlling the operation of system 210. Remote control 270 is preferably a wireless device that includes an infrared transmitter 272 by which an infrared control signal is propagated to IR receiver 276 via transmission path 274. Remote control 270 is preferably a relatively simple input device that features only a limited number of input keys to accommodate normal consumer home-use applications. In alternate embodiments, remote control 270 may also be implemented using other configurations that have a more complete keyboard input system.

In the Internet mode, a user of system 210 may use remote control 270 for controlling set-top box 214 to subsequently access and download selected page data from Internet 212. In practice, IR receiver 276 receives the user-generated infrared control signal via transmission path 274, and then provides a converted control signal to CPU 224 via line 278 to effectively control set-top box 214. In response, CPU 224 generates an Internet search signal to modem 218 via line 226, specifying the selected Internet address or uniform resource locator (URL).

Modem 218 then converts the Internet search signal and propagates the converted Internet search signal via communication line 220 to thereby connect set-top box 214 to the selected Internet address (URL) in Internet 110. Each Internet address preferably corresponds to unique page data from Internet 212. Page data may contain a variety of textual and graphics information, and may also be formatted using a variety of appropriate data formats and data lengths.

After set-top box 214 connects to the selected page data, CPU 224 may then access the selected page data via communication line 220, modem 218 and line 226, and then responsively store the selected page data into non-volatile memory 228 via line 230 or into RAM 236 via line 238. CPU 224 then may access and provide the page data to video decoder 240 via line 242 to be decoded and then provided, via line 250, to TV 244 for display.

The simultaneous viewing mode of system 210 utilizes the present invention to concurrently display both page data (Internet mode) and video data (television mode). Furthermore, the simultaneous viewing mode utilizes a positionable and sizeable window for displaying the video data, and continuously reformats the Internet page data to most-efficiently occupy the remaining space on the screen of television 244. The simultaneous viewing mode of the present invention is further discussed below in conjunction with FIGS. 3–10. In alternate embodiments, the present invention may readily manipulate different types of data in various ways other that those described above in conjunction with the FIG. 2 embodiment.

Figure 3:
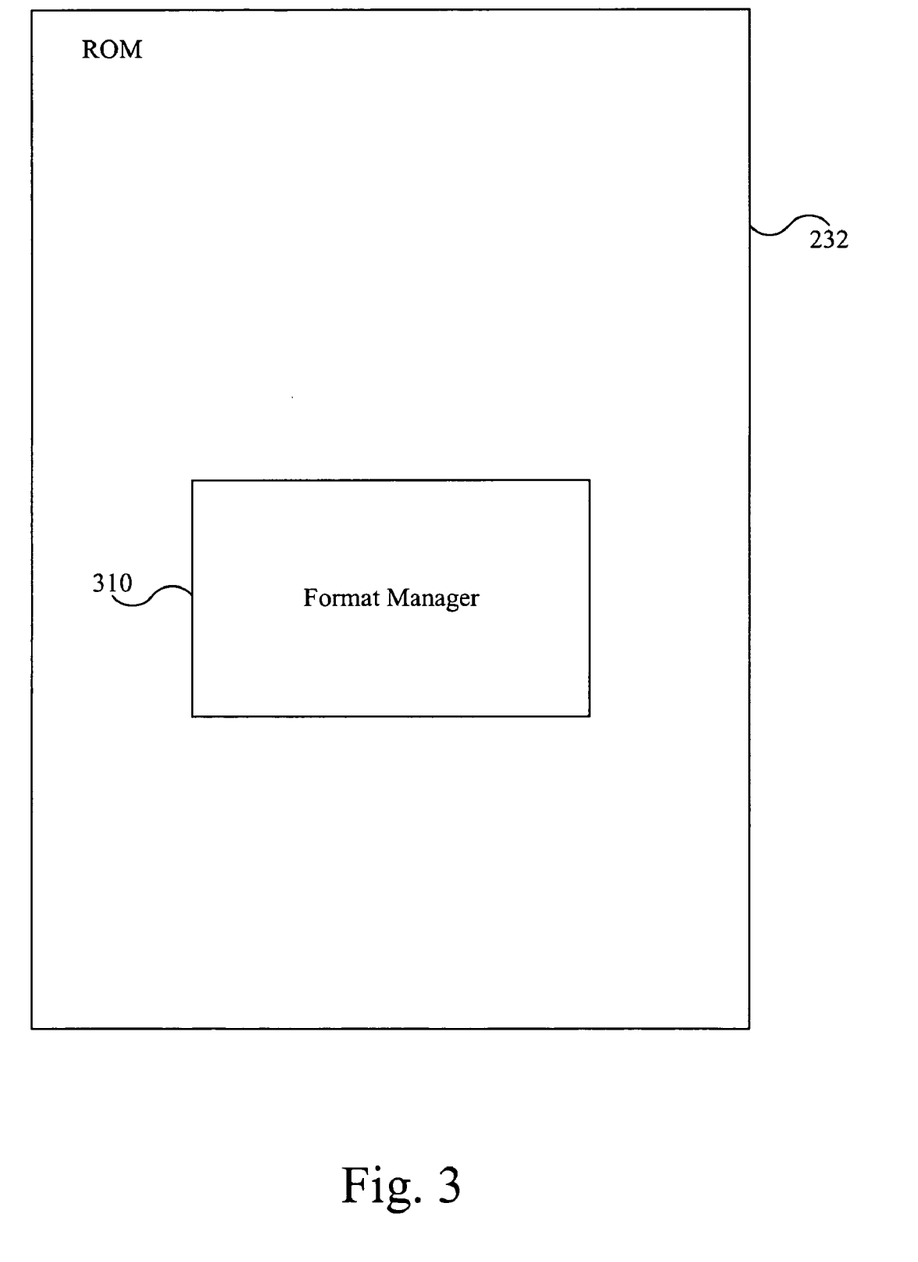
FIG. 3 is a block diagram of one embodiment for the ROM of FIG. 2, according to the present invention.

Referring now to FIG. 3, a block diagram of one embodiment for ROM 232 of FIG. 2 is shown, according to the present invention. In the FIG. 3 embodiment, ROM 232 includes a format manager 310 having a series of instructions which are executable by CPU 224 to simultaneously access video data and Internet page data, in accordance with the present invention. The operation of format manager 310 is further described below in conjunction with FIGS. 5–10.

Figure 4:
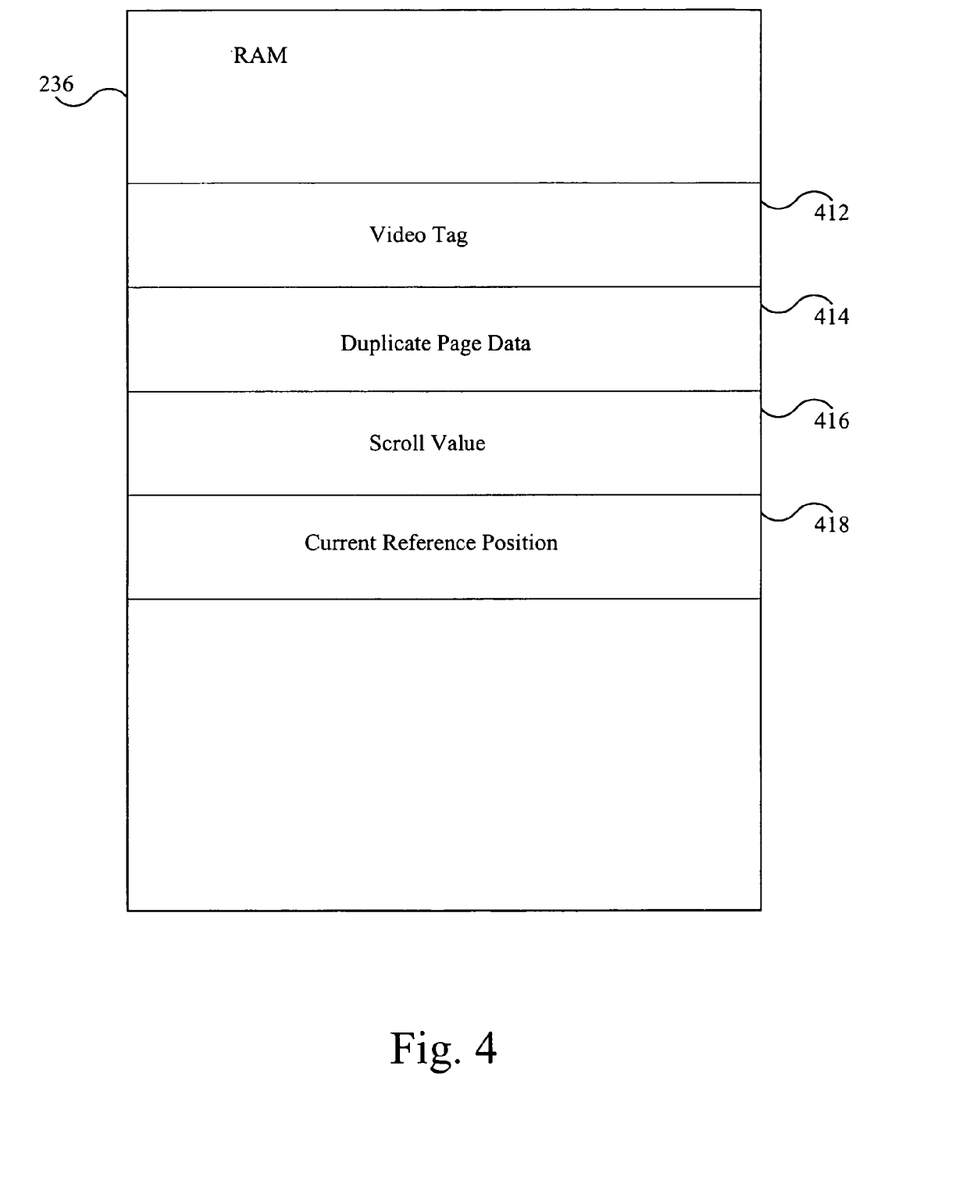
FIG. 4 is a block diagram of one embodiment for the RAM of FIG. 2, according to the present invention.

Referring now to FIG. 4, a block diagram of one embodiment for RAM 236 of FIG. 2 is shown, according to the present invention. In the FIG. 4 embodiment, RAM 236 includes a video tag 412, duplicate page data 414, a scroll value 416, and a current reference position 418. In alternate embodiments, RAM 236 may include various contents in addition to, or instead of, the items described above in conjunction with the FIG. 4 embodiment. The use of the contents of RAM 236 (video tag 412, duplicate page data 414, scroll value 416, and current reference position 418) are further described below in conjunction with FIGS. 5–10.

Figure 5:
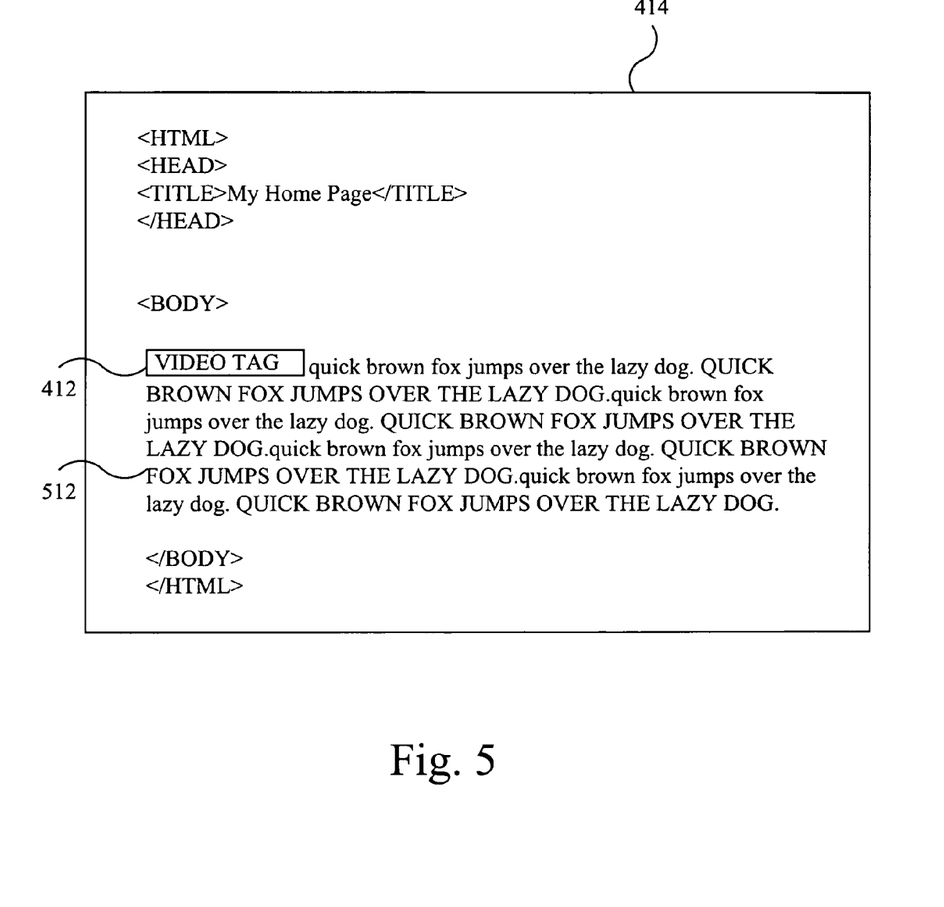
FIG. 5 is a diagram of one embodiment for duplicate page data, in accordance with the present invention.

Referring now to FIG. 5, a diagram of one embodiment for duplicate page data 414 is shown, in accordance with the present invention. In the FIG. 5 embodiment, duplicate page data 414 is shown as a hypertext markup language (HTML) document, however, in alternate embodiments, duplicate page data 414 may likewise be formatted in other appropriate and compatible formats.

Duplicate page data 414 of FIG. 5 preferably includes text data 512 which is unique to the selected duplicate page data 414, and also includes video tag 412 which is preferably obtained from RAM 236 and inserted into duplicate page data 414 by format manager 310. In the preferred embodiment, format manager 310 then utilizes video tag 412 to create a blank window on the screen of television 244 for inserting selected video data. The specific positioning of video tag 412 within duplicate page data 414 preferably indicates the vertical location of the blank video window for inserting the video data.

For example, in the FIG. 5 embodiment, video tag 412 is located at the first line of text data 512 to indicate that the upper edge of the video window should be vertically positioned at the top of the screen of television 244. The video window may thus be vertically aligned in any screen location by changing the location of video tag 412 within duplicate page data 414. Video tag 412 also preferably contains size information and horizontal alignment information for the blank video window, as discussed below in conjunction with FIG. 6.

Figure 6:
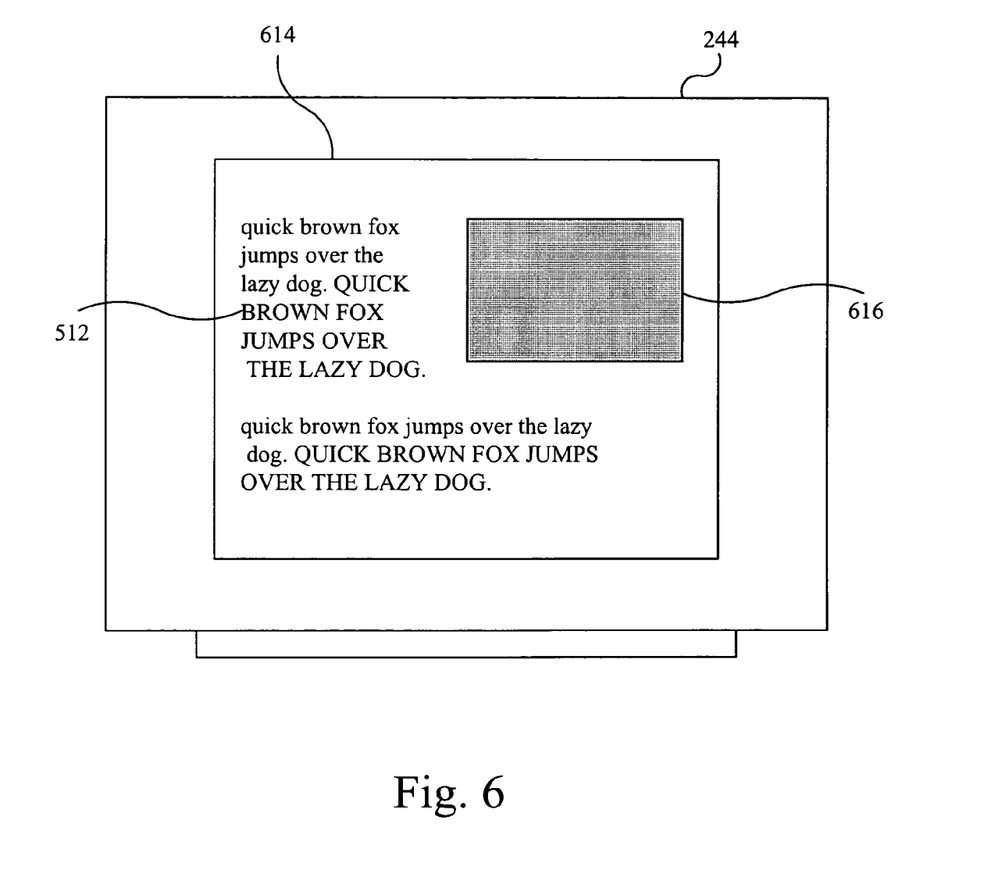
FIG. 6 is a diagram of one embodiment of the FIG. 2 television simultaneously accessing video data and the FIG. 5 page data, according to the present invention.

Referring now to FIG. 6, a diagram of one embodiment of television 244 is shown, while simultaneously accessing video data and page data 414 according to the present invention. In the FIG. 6 example, the displayed page data shown is the same as the duplicate page data 414 shown and discussed above in conjunction with FIG. 5, however, a wide variety of other types of page data may readily be utilized in conjunction with the present invention.

In FIG. 6, television 244 further includes a screen 614 and a video window 616 for inserting selected video data. As discussed above in conjunction with FIG. 5, format manager 310 vertically positions video window 616 at the top of screen 614 due to the specific location of video tag 412 within data page 414. In the preferred embodiment, format manager 310 also reformats text data 512 to advantageously utilize the remaining area of screen 614 in the most effective and efficient manner.

For example, format manager 310 may reformat text data 512 to avoid video window 616 and yet still maximize the amount of text data 512 displayed on screen 614. In the preferred embodiment, the location and size of video window 616, as well as the specific criteria for reformatting text data 512 are selectable by a user of system 210 using remote control 270.

Figure 7:
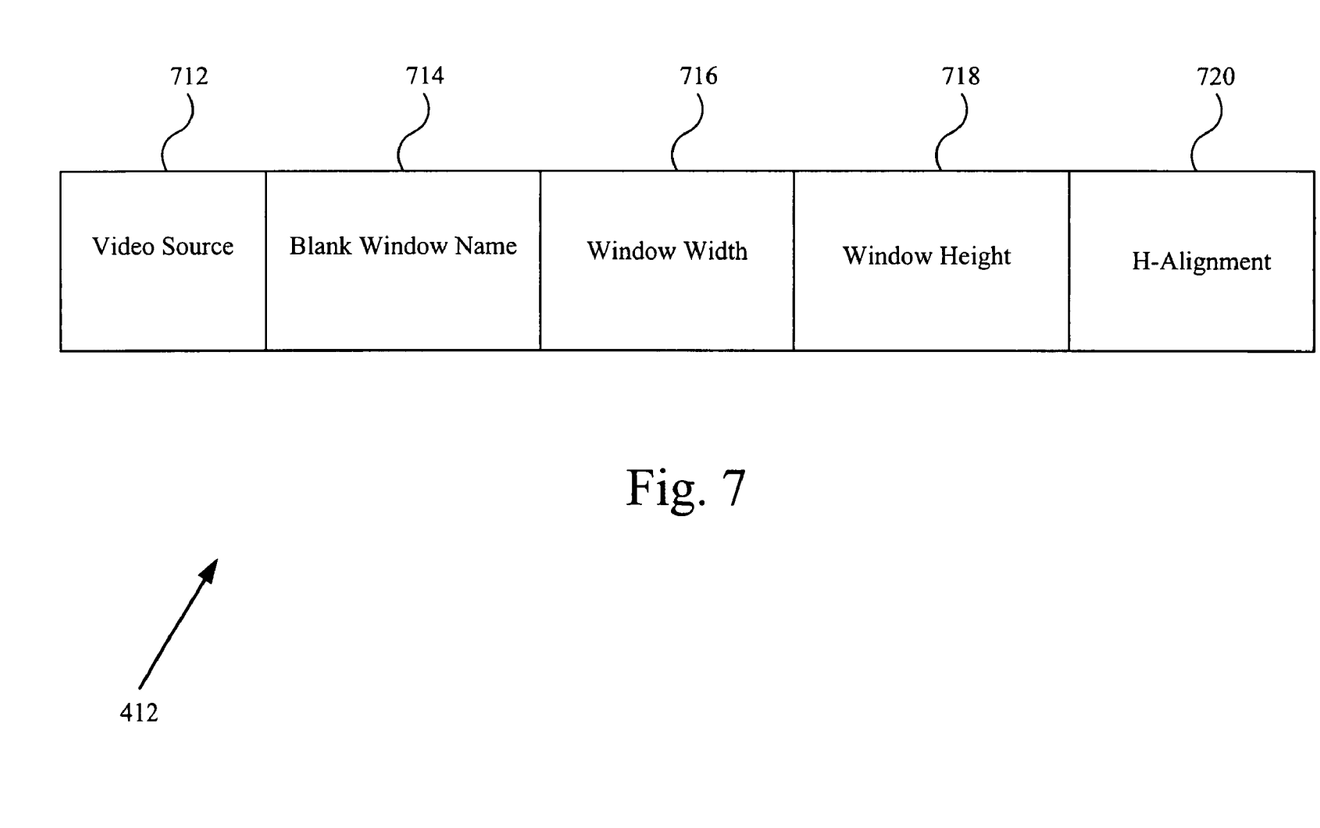
FIG. 7 is a diagram of one embodiment for the video tag of FIG. 4, according to the present invention.

Referring now to FIG. 7, a diagram of one embodiment for video tag 412 of FIG. 4 is shown, according to the present invention. In the FIG. 4 embodiment, video tag 412 includes a video source parameter 712, a blank window name 714, a window width parameter 716, a window height parameter 718, and an H-alignment parameter 720. In alternate embodiments, video tag 412 may include additional or substitute elements and parameters.

Format manager 310 may thus access video tag 412 to correctly position and size video window 616. Video source parameter 712 preferably indicates the source of video data for insertion into video window 616. Blank window name 714 preferably specifies a name for identifying video window 616. Window width parameter 716 preferably specifies the width of video window 616 in pixels. Window height parameter 718 preferably specifies the height of video window 616 in pixels. H-alignment parameter 720 specifies the horizontal position of video window 616 on screen 614.

For example, H-alignment parameter 720 may indicate "left" to specify that video window 616 is positioned to the extreme left of screen 614. Alternately, H-alignment parameter 720 may indicate "right" to specify that video window 616 is positioned to the extreme right of screen 614. In the preferred embodiment, parameters 712 through 720 may be selectively edited by a user of system 210 to control the operation of video window 616.

Figure 8:
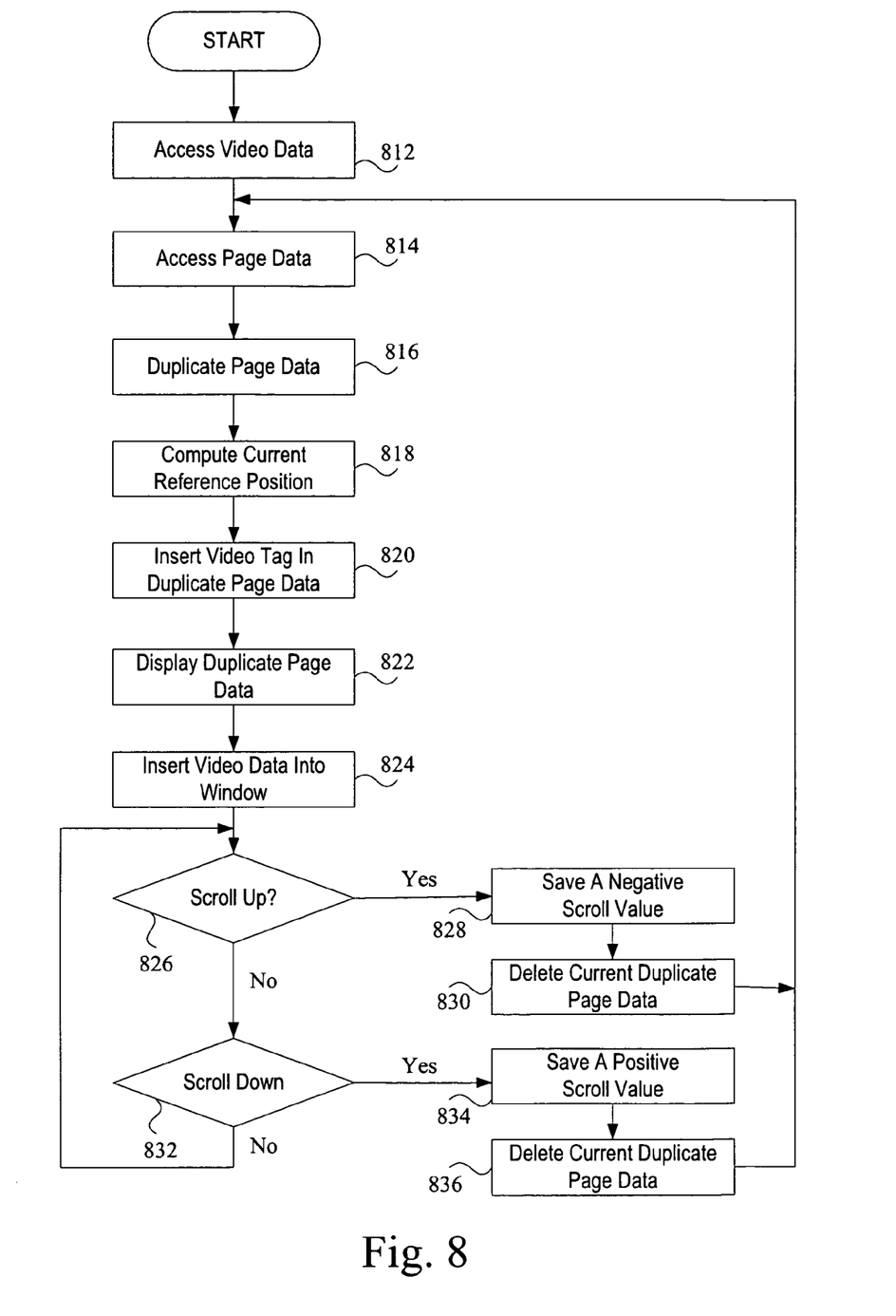
FIG. 8 is a flowchart of preferred method steps for simultaneously accessing video data and Internet page data, according to the present invention.

Referring now to FIG. 8, a flowchart of preferred method steps for simultaneously accessing video data and Internet page data is shown, according to the present invention. Initially, in step 812, CPU 224 accesses video data from video source 264 as previously described in conjunction with FIG. 2. Then, in step 814, CPU 224 accesses selected page data from the Internet 212 or other source, as described above in conjunction with FIG. 2. Next, in step 816, format manager 310 copies the page data accessed during the previous step 814 to obtain duplicate page data 414 which is preferably stored in RAM 236.

Then, in step 818, format manager 310 computes a current reference position 418 which is preferably stored in RAM 236. Current reference position 418 is a changeable location in duplicate page data 414 that corresponds to a fixed position on screen 614 of television 244. Format manager 310 uses current reference position 418 as a stationary reference point on screen 614 from which to accurately position video window 616. Scrolling page data 414 up or down on screen 614 causes a different portion of page data 414 to be located at a given point on screen 614. Therefore, a current reference point 418 is preferably re-computed whenever page data 414 is scrolled up or down on screen 614.

For example, in one embodiment of the present invention, the current reference position 418 may be specified to be the top-left corner of screen 614, and format manager 310 may then position video window 616 by referring to the specified current reference position 418 to insert video tag 412. However, format manager 310 need not insert video tag 412 directly at current reference position 418, but rather, format manager 310 preferably uses current reference position 418 as an orientation point to determine the current positional relationship between video window 616 on screen 614 and the scrolled duplicate page data 414.

Initially, before scrolling occurs, the current reference position 418 is known, because the top-left position of page data 414 corresponds to the top-left position of screen 614. Subsequently, after each scrolling event occurs, format manager 310 preferably recalculates current reference position 418, as discussed below in conjunction with FIGS. 8–10, to re-establish a reference for inserting video tag 412 to position stationary video window 616.

In step 820, format manager 310 accesses video tag 412 from RAM 236, and then inserts video tag 412 into duplicate page data 414 stored in RAM 236. Format manager 310 preferably accesses current reference position 418 to use as a reference point from which to insert video tag 412 into duplicate page data 414, and thus maintains video window 616 in a stationary location in spite of any scrolling actions. As described above in conjunction with FIGS. 5–6, format manager 310 preferably inserts video tag 412 into a selected location in duplicate data page 414 to indicate the vertical alignment of video window 616 in screen 614. Video tag 412 also preferably includes sizing and horizontal alignment information as discussed above in conjunction with FIG. 7. In the preferred embodiment, a user of system 210 may specify the desired position and size of video window 616 by editing the contents of video tag 412, and by changing the insertion point of video tag 412 in duplicated page data 414.

In step 822, format manager 310 displays duplicate page data 414 (now containing inserted video tag 412). In order to display duplicate page data 414, format manager 310 preferably first creates a blank video window 616 on screen 614 to conform to the position and sizing information derived from video tag 412 (in reference to current reference position 418). Then, format manager 310 reformats the contents of duplicate data page 414 to avoid video window 616 on screen 614, and to also utilize the remaining area of screen 614 in an effective manner, as discussed above in conjunction with FIG. 6.

Next, in step 824, format manager 310 inserts the video data obtained during foregoing step 812 into the video window 616 displayed on screen 614 to simultaneously display video data and Internet page data, according to the present invention. In step 826, format manager 310 determines whether displayed duplicate page data 414 has been scrolled up on screen 614. If displayed duplicate page data 414 has been scrolled up, then in step 828, format manager 310 stores a negative scroll value 416 into RAM 236. The negative scroll value 416 is proportional to the distance duplicate page data 414 was scrolled on screen 614. Then, in step 830, format manager 310 deletes the current duplicate page data 414 from RAM 236, and the FIG. 8 process returns to step 814.

In foregoing step 826, if format manager 310 determines that displayed duplicate page data 414 has not been scrolled up, then, in step 832, format manager 310 determines whether displayed duplicate page data 414 has been scrolled down on screen 614. If displayed duplicate page data 414 has been scrolled down, then in step 834, format manager 310 stores a positive scroll value 416 into RAM 236. The positive scroll value 416 is proportional to the distance duplicate page data 414 was scrolled on screen 614. Then, in step 836, format manager 310 deletes the current duplicate page data 414 from RAM 236, and the FIG. 8 process returns to step 814 to continue simultaneously displaying video data and Internet page data, according to the present invention.

Figure 9:
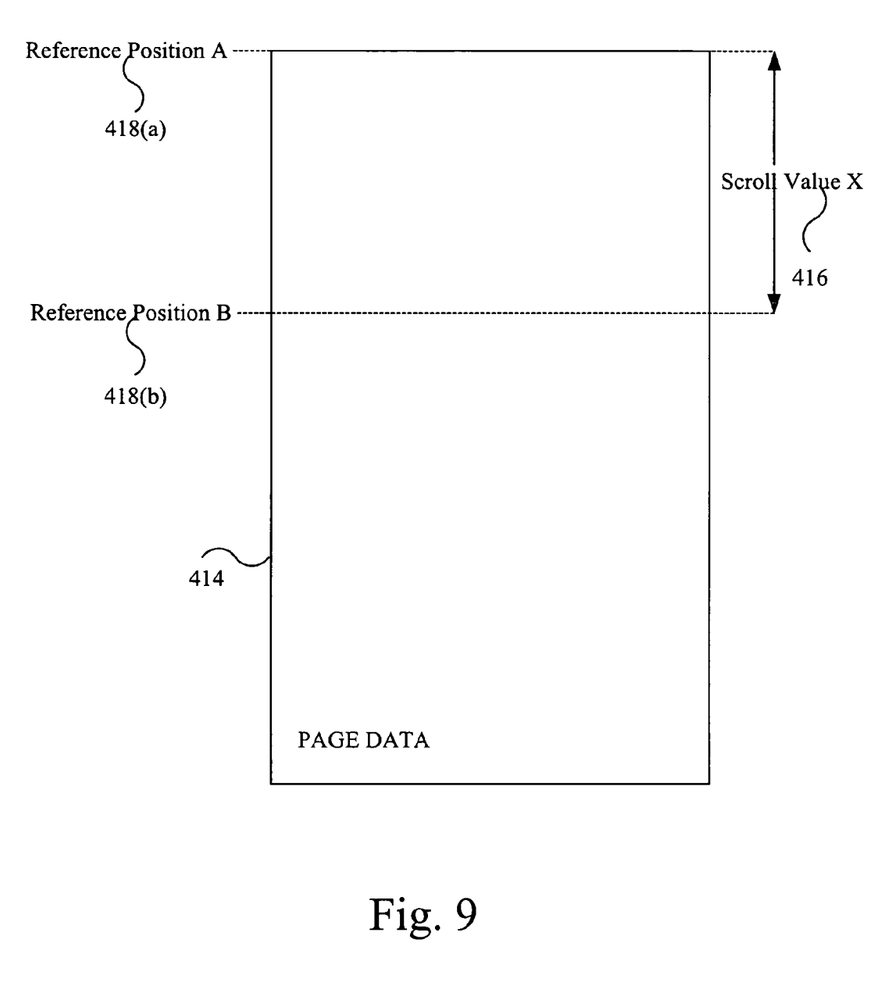
FIG. 9 is a diagram of exemplary page data, including reference positions and a corresponding scroll value, according to the present invention.

Referring now to FIG. 9, a diagram of duplicate page data 414, including reference position A (418($a$)), reference position B (418($b$)), and a scroll value X (416), is shown, according to the present invention. In the FIG. 9 example, for the sake of illustration, presume that reference position A (418($a$)) is initially located at the top of screen 614, and that duplicate page data 414 is subsequently scrolled down to reference position B (418($b$)). In response, format manager 310 preferably stores a scroll value X (416) into RAM 236, and the stored scroll value X (416) is proportional to the scrolled distance between reference position A (418($a$)) and reference position B (418($b$)) on duplicate page data 414. Scroll value X (416) is preferably a positive value for a scroll-down action, and is preferably a negative value for a scroll-up action.

A current reference position 418 may therefore preferably be calculated from the stored scroll value X (416), by using the following formula:

Current reference position=Prior reference position+Scroll value $X$, where the prior reference position is the reference position on duplicate page data 414 immediately prior to the current scrolling action.

Figure 10:
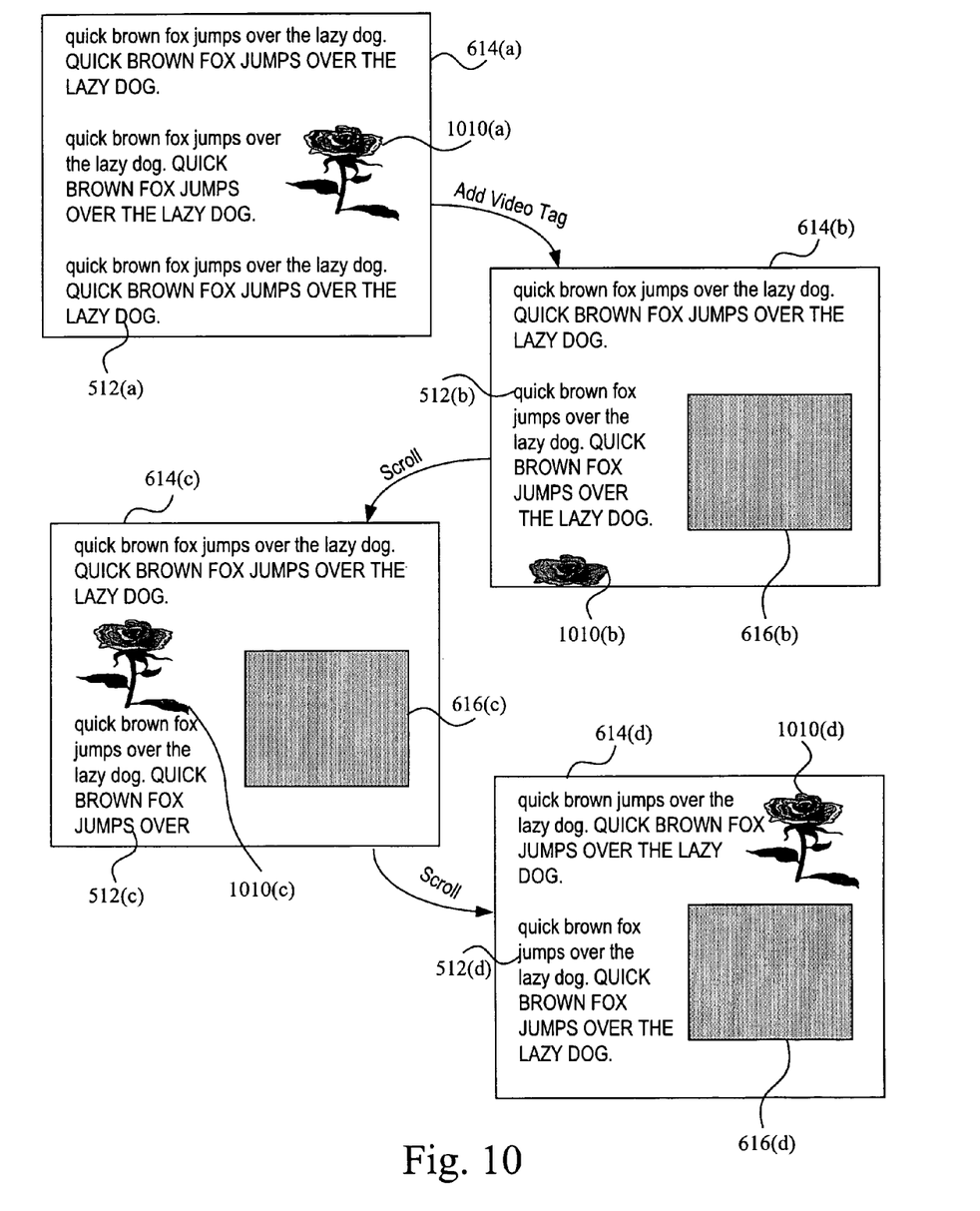
FIG. 10 is a sequence of exemplary drawings showing scrolling and reformatting of page data, according to the present invention.

Referring now to FIG. 10, a sequence of exemplary screens 614($a$) through 614($d$) is shown, illustrating scrolling and reformatting of duplicate page data 414, according to the present invention. Initially, in screen 614($a$), format manager 310 displays duplicate page data 414, including text 512($a$) and graphic 1010($a$).

In screen 614($b$), format manager 310 has added a video tag 412 to create a positionable and sizeable video window 616($b$), in accordance with the present invention. In screen 614($b$), format manager 310 has also reformatted text 512($b$) and graphic 1010($b$) of duplicate page data 414 to advantageously avoid the stationary video window 616($b$).

In screen 614($c$), a user of system 210 has scrolled down the contents of page data 414. In accordance with the present invention, format manager 310 has maintained the size and location of video window 616($c$), and has again reformatted text 512($c$) and graphic 1010($c$) in page data 414 to avoid the stationary video window 616($c$).

Finally, in screen 614($d$), a user of system 210 has again scrolled down the contents of page data 414. Format manager 310 has maintained the size and location of video window 616($d$), and has again reformatted text 512($d$) and graphic 1010($d$) in page data 414 to avoid the stationary video window 616($d$).

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. For example, the present invention need not be restricted to configurations or applications that manipulate page data from the Internet, but may readily be used with many different types of data. Therefore, these and other variations upon the preferred embodiments are intended to be covered by the present invention, which is limited only by the appended claims.

What is claimed is:

1. A system for selectively accessing video data and page data, comprising:
   a format manager for manipulating said video data and said page data, said format manager copying said page data to create duplicate page data, inserting a video tag into said duplicate page data, and selectively positioning said video tag to vertically locate a video window on a display device in relation to a current reference position on said display device, said video window being repositionable and resizeable within said duplicate page data on said display device, said video window displaying a video program currently in progress, said duplicate page data being scrollable with reference to said video window on said display device, said format manager recomputing said current reference position each time said duplicate page data is scrolled to maintain said video window in a stationary position on said display device, said current reference position being computed by combining a prior reference position and a scroll value, said scroll value being positive when said duplicate page data is scrolled down, said scroll value being negative when said duplicate page data is scrolled upwards; and a processor, coupled to said format manager for controlling said format manager, whereby said video data and said duplicate page data are simultaneously shown on said display device.

2. A method for selectively accessing video data and page data, comprising the steps of:

manipulating said video data and said page data using a format manager, said format manager copying said page data to create duplicate page data, inserting a video tag into said duplicate page data, and selectively positioning said video tag to vertically locate a video window on a display device in relation to a current reference position on said display device, said video window displaying a video program currently in progress, said video window being repositionable and resizeable within said page data on said display device, said duplicate page data being scrollable with reference to said video window on said display device, said format manager recomputing said current reference position each time said duplicate page data is scrolled to maintain said video window in a stationary position on said display device, said current reference position being computed by combining a prior reference position and a scroll value, said scroll value being positive when said duplicate page data is scrolled down, said scroll value being negative when said duplicate page data is scrolled upwards; and controlling said format manager using a processor, whereby said video data and said duplicate page data are simultaneously shown on a display device.

3. A system for selectively accessing video data and Internet page data, comprising:

a format manager for manipulating said video data and said Internet page data, said format manager providing a video window on a display device for displaying said video data, said video window displaying a video program currently in progress, said video window being selectively positionable and sizeable within said Internet page data, said Internet page data being scrollable with reference to said video window by utilizing a scroll value, said format manager positioning a video tag to vertically locate said video window on said display device in relation to a current reference position on said display device, said format manager copying said Internet page data to create duplicate Internet page data for displaying on said display device, said format manager positioning said video tag within said duplicate Internet page data to vertically position said video window, said format manager recomputing said current reference position each time said Internet page data is scrolled on said display device in relation to said video window to maintain said video window in a stationary position on said display device; and a processor configured to control said format manager, whereby said video data received from a video programming source and said Internet page data are simultaneously shown on said display device.

4. The system of claim 3 wherein said current reference position is recomputed by combining a prior reference position and a scroll value.

* * * * *